US012136343B2

(12) United States Patent
Tanaka et al.

(10) Patent No.: US 12,136,343 B2
(45) Date of Patent: Nov. 5, 2024

(54) INFORMATION TRANSMISSION APPARATUS, INFORMATION TRANSMISSION METHOD, AND NON-TRANSITORY COMPUTER-READABLE MEDIUM

(71) Applicant: NEC Corporation, Tokyo (JP)

(72) Inventors: Tomoaki Tanaka, Tokyo (JP); Kouichi Ono, Tokyo (JP); Norihiro Ide, Tokyo (JP); Tsukasa Kasuya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 62 days.

(21) Appl. No.: 18/026,707

(22) PCT Filed: Sep. 28, 2020

(86) PCT No.: PCT/JP2020/036586
§ 371 (c)(1),
(2) Date: Mar. 16, 2023

(87) PCT Pub. No.: WO2022/064684
PCT Pub. Date: Mar. 31, 2022

(65) Prior Publication Data
US 2023/0343215 A1 Oct. 26, 2023

(51) Int. Cl.
*G08G 1/123* (2006.01)
*G06Q 50/30* (2012.01)
*G06Q 50/40* (2024.01)

(52) U.S. Cl.
CPC ............. *G08G 1/123* (2013.01); *G06Q 50/40* (2024.01)

(58) Field of Classification Search
CPC ........ G08G 1/123; G08G 1/005; G06Q 50/40; G06Q 50/10
See application file for complete search history.

(56) References Cited

U.S. PATENT DOCUMENTS

2007/0112509 A1* 5/2007 Kikuchi ................. G06Q 10/04 701/423
2015/0228193 A1* 8/2015 Bick ................ G08G 1/096883 340/990

(Continued)

FOREIGN PATENT DOCUMENTS

JP 2004-234469 A 8/2004
JP 2005-164474 A 6/2005

(Continued)

OTHER PUBLICATIONS

International Search Report for PCT Application No. PCT/JP2020/036586, mailed on Dec. 15, 2020.

*Primary Examiner* — Sisay Yacob
(74) *Attorney, Agent, or Firm* — Sughrue Mion, PLLC

(57) ABSTRACT

An information transmission apparatus includes an information acquisition unit, a route determination unit, and an information for a passenger transmission unit. The information acquisition unit acquires boarding stop information indicating a boarding stop for a passenger, and getting-off stop information indicating a getting-off stop for the passenger. The route determination unit determines, by using a route information storage unit, and the boarding stop information and the getting-off stop information, route information indicating a route of a vehicle that the passenger should board. The information for a passenger transmission unit transmits information for a passenger to a terminal of the passenger at a timing determined by using a current position of a vehicle traveling on a route indicated by the route information, and the boarding stop information. The information for a passenger includes boarding vehicle information, for example, an appearance image and a vehicle number of the vehicle.

20 Claims, 13 Drawing Sheets

20

(56) References Cited

U.S. PATENT DOCUMENTS

| | | | | |
|---|---|---|---|---|
| 2018/0040245 | A1* | 2/2018 | Bick | H04W 4/42 |
| 2019/0293438 | A1* | 9/2019 | Simpson | G06F 16/9537 |
| 2019/0318286 | A1* | 10/2019 | Simpson | G06Q 10/06315 |
| 2020/0019761 | A1* | 1/2020 | Kang | G06V 10/764 |
| 2021/0166317 | A1* | 6/2021 | Simpson | G06Q 30/0206 |

FOREIGN PATENT DOCUMENTS

| | | | |
|---|---|---|---|
| JP | 2006-268604 | A | 10/2006 |
| JP | 2010-092205 | A | 4/2010 |
| JP | 2010-097253 | A | 4/2010 |
| JP | 2013-206054 | A | 10/2013 |
| JP | 2014-010493 | A | 1/2014 |
| JP | 2017-107532 | A | 6/2017 |

* cited by examiner

FIG. 3

120

| PASSENGER ID (TERMINAL ID) | CURRENT POSITION | REGISTRATION DATE AND TIME | BOARDING STOP | GETTING-OFF STOP | ROUTE ID | BOARDING COMPLETED | GETTING-OFF COMPLETED |
|---|---|---|---|---|---|---|---|
| | | | | | | | |
| | | | | | | | |
| | | | | | | | |

FIG. 4

130

| COMMUNICATION APPARATUS ID | CURRENT POSITION | VEHICLE INFORMATION | |
|---|---|---|---|
| | | AUTOMOBILE REGISTRATION NUMBER | APPEARANCE IMAGE |
| | | | |
| | | | |

FIG. 5A

140

STOP INFORMATION

| STOP ID | STOP NAME | POSITION INFORMATION |
| --- | --- | --- |
| | | |

FIG. 5B

140

ROUTE INFORMATION

| ROUTE ID | ROUTE NAME |
| --- | --- |
| | |

FIG. 5C

140

ROUTE STOP INFORMATION

| ROUTE ID | STOP NUMBER | STOP ID |
| --- | --- | --- |
| | | |
| | | |

FIG. 5D

140

SERVICE INFORMATION

| ROUTE ID | DEPARTURE TIME | COMMUNICATION APPARATUS ID |
| --- | --- | --- |
| | | |
| | | |

20

20

INFORMATION TRANSMISSION APPARATUS, INFORMATION TRANSMISSION METHOD, AND NON-TRANSITORY COMPUTER-READABLE MEDIUM

This application is a National Stage Entry of PCT/JP2020/036586 filed on Sep. 28, 2020, the contents of all of which are incorporated herein by reference, in their entirety.

TECHNICAL FIELD

The present invention relates to an information transmission apparatus, an information transmission method, and a program.

BACKGROUND ART

There is a vehicle such as a fixed-route bus that runs on a previously determined route while stopping at a previously determined stop. In such a vehicle, a plurality of vehicles that run on routes differing from each other may stop at the same stop in some area. In this case, it is difficult for a passenger waiting at a stop to determine whether a vehicle is the vehicle which he/she should ride.

In this regard, Patent Document 1 describes the following server. It is described that, when the server receives a route search condition including a departure point and a destination from a terminal apparatus, the server searches for a guide route, and also transmits a link button to detailed information on a bus when the route includes a bus route. When the link button is selected, the server transmits, to the terminal apparatus, image data associated to a specified bus route. The image data to be transmitted include an appearance image of a bus.

Note that, Patent Document 2 describes that an in-vehicle system mounted on a bus outputs audio guide information by using an external speaker, and a route ID or the like is embedded in the guide information as an electronic watermark. Further, Patent Document 2 also describes that an information terminal of a user acquires, by using the electronic watermark, and displays information on a plurality of bus stops where the bus stops, and the like.

Moreover, Patent Document 3 describes the following. First, an information management apparatus displays, on a display, information such as a boarding stop name, a boarding time, and a getting-off stop name transmitted from a user. Then, an operation manager looks at a content displayed on the display, searches for a bus that can stop by the stop and carry the user, and transmits vehicle allocation command data from the information management apparatus to an information distribution apparatus. The information distribution apparatus transmits the vehicle allocation command data to an information terminal owned by a bus driver.

RELATED DOCUMENT

Patent Document

Patent Document 1: Japanese Patent Application Publication No. 2013-206054

Patent Document 2: Japanese Patent Application Publication No. 2017-107532

Patent Document 3: Japanese Patent Application Publication No. 2004-234469

SUMMARY OF THE INVENTION

Technical Problem

As described above, vehicles that run on routes differing from each other may stop at the same stop in some area. In this case, it is difficult for a passenger waiting at a stop to determine whether a vehicle is the vehicle intended by him/her. One of objects of the present invention is to allow a passenger being present at a stop to easily determine a vehicle which he/she should ride.

Solution to Problem

An information transmission apparatus according to an example aspect of the invention includes:

an information acquisition unit that acquires boarding stop information indicating a boarding stop where a passenger boards a vehicle, and getting-off stop information indicating a getting-off stop where the passenger gets off the vehicle;

a route determination unit that determines, by using a route information storage unit storing a plurality of stops included in a route for each of a plurality of the routes, the boarding stop information, and the getting-off stop information, route information indicating a route of a vehicle that the passenger should board; and an information for a passenger transmission unit that determines, by using a current position of a boarding target vehicle traveling on the route indicated by the route information, and the boarding stop information, a timing of transmitting information for a passenger including information on the boarding target vehicle, and transmits, at the determined timing, the information for a passenger to a terminal carried by the passenger.

An information transmission method performed by a computer according to an example aspect of the invention includes:

information acquisition processing of acquiring boarding stop information indicating a boarding stop where a passenger boards a vehicle, and getting-off stop information indicating a getting-off stop where the passenger gets off the vehicle;

route determination processing of determining, by using a route information storage unit storing a plurality of stops included in a route for each of a plurality of the routes, the boarding stop information, and the getting-off stop information, route information indicating a route of a vehicle that the passenger should board; and information for a passenger transmission processing of determining, by using a current position of a boarding target vehicle traveling on the route indicated by the route information, and the boarding stop information, a timing of transmitting information for a passenger including information on the boarding target vehicle, and transmitting, at the determined timing, the information for a passenger to a terminal carried by the passenger.

A program according to an example aspect of the invention causes a computer to include:

an information acquisition function of acquiring boarding stop information indicating a boarding stop where a passenger boards a vehicle, and getting-off stop information indicating a getting-off stop where the passenger gets off the vehicle;

a route determination function of determining, by using a route information storage unit storing a plurality of stops included in a route for each of a plurality of the routes, the boarding stop information, and the getting-off stop information, route information indicating a route of a vehicle that the passenger should board; and an information for a passenger transmission function of determining, by using a current position of a boarding target vehicle traveling on the route indicated by the route information, and the boarding stop information, a timing of transmitting information for a passenger including information on the boarding target vehicle, and transmitting, at the determined timing, the information for a passenger to a terminal carried by the passenger.

Advantageous Effects of Invention

According to the present invention, a passenger being present at a stop can easily determine a vehicle which he/she should ride.

BRIEF DESCRIPTION OF THE DRAWINGS

The above-described object, other objects, features, and advantageous effects will become more apparent from a preferred example embodiment described below and the following accompanying drawings.

FIG. 3 is a diagram illustrating one example of information stored by a passenger information storage unit.

FIG. 4 is a diagram illustrating one example of information stored by a vehicle information storage unit.

FIGS. 5A to 5D are diagrams illustrating one example of information stored by a route information storage unit.

DESCRIPTION OF EMBODIMENTS

Hereinafter, an example embodiment of the present invention is described by using drawings. Note that, in all of the drawings, a similar component is allocated with a similar reference sign, and description thereof is omitted, as appropriate.

Figure 1:
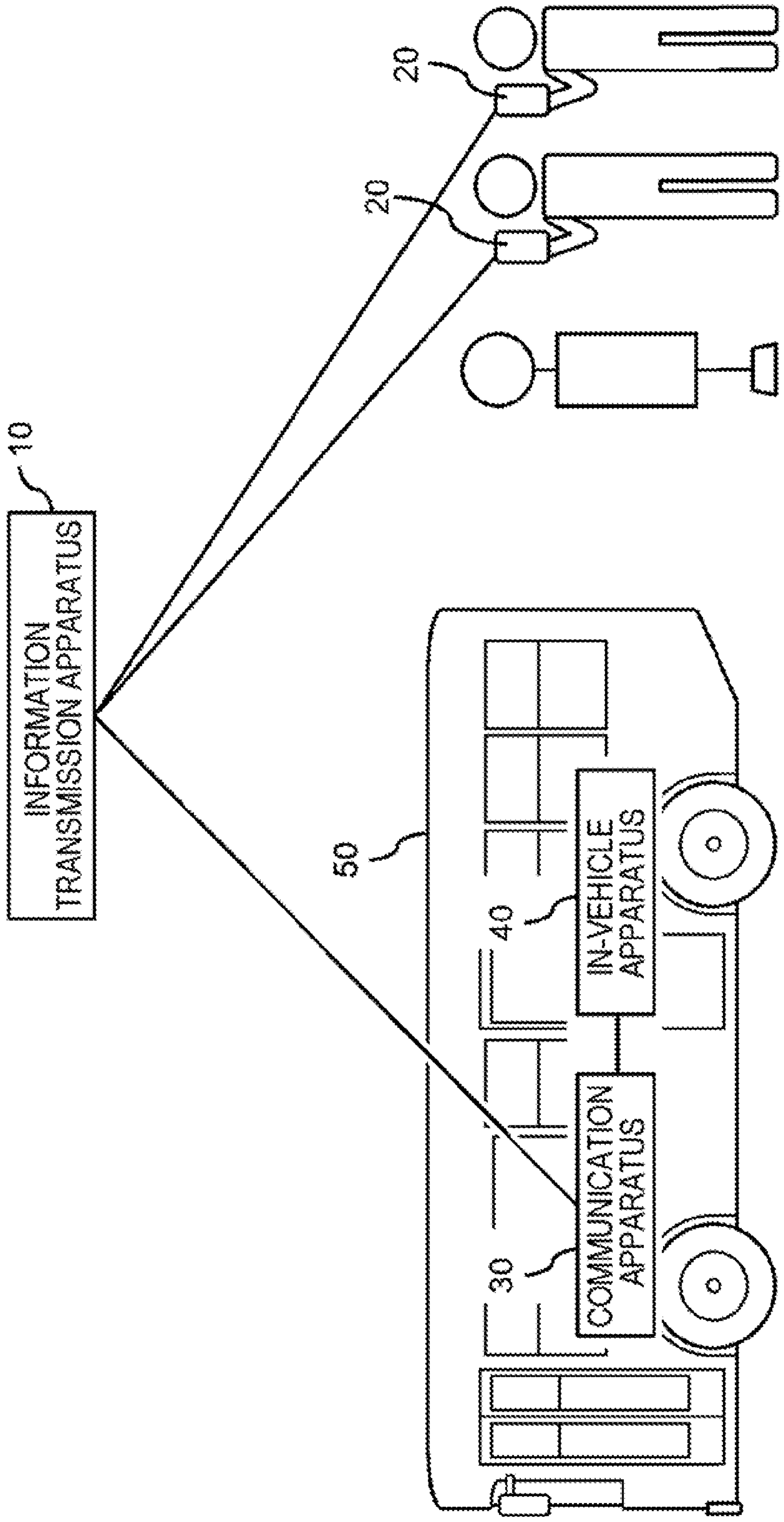
FIG. 1 is a diagram for describing a usage environment of an information transmission apparatus according to an example embodiment.

FIG. 1 is a diagram for describing a usage environment of an information transmission apparatus 10 according to an example embodiment. The information transmission apparatus 10 is used together with a portable terminal 20, a communication apparatus 30, and an in-vehicle apparatus 40. The communication apparatus 30 and the in-vehicle apparatus 40 are mounted on a vehicle 50. The vehicle 50 runs on a previously determined route while stopping at a previously determined stop. One example of the vehicle 50 is a fixed-route bus. The terminal 20 includes a wireless communication function, and is utilized by a passenger boarding the vehicle 50. One example of the terminal 20 is a so-called smartphone or tablet type terminal. The information transmission apparatus 10 transmits information relating to the vehicle 50 to the terminal 20, and also transmits information relating to a passenger to the communication apparatus 30.

The in-vehicle apparatus 40 computes a current position of the vehicle 50 by using, for example, a global positioning system (GPS). The communication apparatus 30 transmits the current position computed by the in-vehicle apparatus 40 to the information transmission apparatus 10.

Moreover, the communication apparatus 30 receives predetermined information from the information transmission apparatus 10. The in-vehicle apparatus 40 displays the information received by the communication apparatus 30 on a display attached to the vehicle 50. The display may be a display for a driver of the vehicle 50 (e.g., a display provided on a front panel of a driver's seat), may be a display for a passenger who has already got in the vehicle 50 (e.g., a display provided in a region where a passenger rides), or may be a display for a passenger who is about to get into the vehicle 50 (e.g., a display provided near a passenger door of an outer surface of the vehicle 50).

The terminal 20 transmits, to the information transmission apparatus 10, information indicating a stop at which a passenger boards (hereinafter, referred to as a boarding stop) and information indicating a stop at which a passenger gets off (hereinafter, referred to as a getting-off stop). The information transmitted to the information transmission apparatus 10 by the terminal 20 preferably includes a date and time (i.e., a date and time when a boarding stop and a getting-off stop are registered). Then, the information transmission apparatus 10 searches for a route for going to the getting-off stop from the boarding stop. Then, the information transmission apparatus 10 transmits, to the terminal 20, information (hereinafter, referred to as information for a passenger) that should be reported to a passenger when the vehicle 50 running on the route approaches the boarding stop. Information for a passenger includes information (hereinafter, referred to as boarding vehicle information) relating to the vehicle 50 approaching the stop. The boarding vehicle information includes, for example, an appearance image of the vehicle 50 and an automobile registration number (i.e., a vehicle number).

The terminal 20 displays the information for a passenger received from the information transmission apparatus 10, and causes a passenger to recognize the information for a passenger. Thereby, when the vehicle 50 comes to the boarding stop, a passenger can determine easily and in a short time whether the vehicle 50 is the vehicle 50 which he/she should board.

Moreover, the information transmission apparatus 10 stores, for each stop, a getting-off stop for a passenger waiting at the stop. When the vehicle 50 approaches a stop, the information transmission apparatus 10 transmits, to the vehicle 50, information (hereinafter, referred to as information for a vehicle) indicating a getting-off stop for a passenger waiting at the stop. The information for a vehicle also includes a getting-off stop for a passenger who does not board the vehicle 50, in addition to a getting-off stop for a passenger who boards the vehicle 50. In other words, the information transmission apparatus 10 transmits, to the vehicle 50, information relating to all passengers who designate the stop as a boarding stop. Then, the in-vehicle apparatus 40 displays a getting-off stop included in the information for a vehicle, on a display for a driver of the vehicle 50. Thereby, the driver of the vehicle 50 can perform an announcement according to the getting-off stop, when stopping at a stop.

Figure 2:
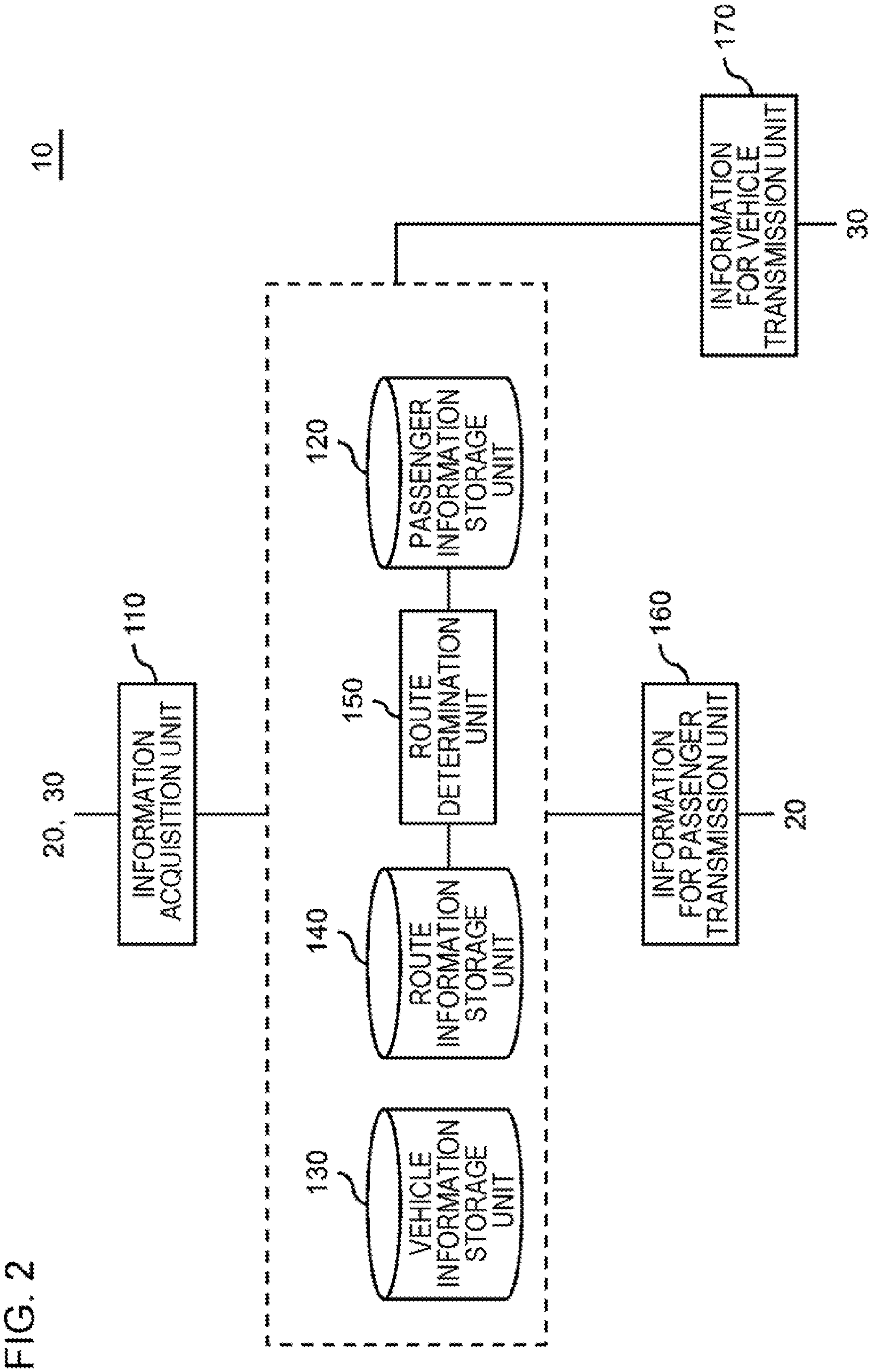
FIG. 2 is a diagram illustrating one example of a functional configuration of the information transmission apparatus.

FIG. 2 is a diagram illustrating one example of a functional configuration of the information transmission apparatus 10. In the example illustrated in the present figure, the information transmission apparatus 10 includes an information acquisition unit 110, a route determination unit 150, and an information for a passenger transmission unit 160.

The information acquisition unit 110 acquires boarding stop information indicating a boarding stop for a passenger, and getting-off stop information indicating a getting-off stop for the passenger. Each of the boarding stop information and the getting-off stop information may be a name of the stop or an ID thereof.

The route determination unit 150 determines route information indicating a route of a vehicle which a passenger should board, by using a route information storage unit 140, and the boarding stop information and the getting-off stop information acquired by the information acquisition unit 110. Specifically, the route information storage unit 140 stores a plurality of stops included in a route for each of a plurality of the routes (e.g., for each Route identification (ID)). Then, the route determination unit 150 determines a route passing through the boarding stop and the getting-off stop from among the plurality of routes, and reads, from the route information storage unit 140, route information indicating the route, e.g., a Route ID.

The information for a passenger transmission unit 160 determines a timing of transmitting information for a passenger, by using a current position of the vehicle 50 (boarding target vehicle) traveling on a route indicated by route information, and boarding stop information, and transmits information for a passenger to the terminal 20 of a passenger at the determined timing. As described above, the information for a passenger includes boarding vehicle information of the vehicle 50 to be a boarding target vehicle, for example, an appearance image and a vehicle number.

In the example illustrated in the present figure, the information transmission apparatus 10 further includes a passenger information storage unit 120 and a vehicle information storage unit 130.

The passenger information storage unit 120 stores, for each passenger, information relating to the passenger, for example, boarding stop information and getting-off stop information. The vehicle information storage unit 130 stores information relating to the vehicle 50, for example, a current position of the vehicle 50. Then, the information acquisition unit 110 acquires information relating to a passenger from the terminal 20, and updates the passenger information storage unit 120 by using the acquired information. Moreover, the information acquisition unit 110 acquires information relating to the vehicle 50 (e.g., a current position of the vehicle 50) from the communication apparatus 30, and updates the vehicle information storage unit 130 by using the acquired information. Update of the passenger information storage unit 120 and the vehicle information storage unit 130 is repeatedly performed.

Then, the information for a passenger transmission unit 160 uses the passenger information storage unit 120 and the vehicle information storage unit 130, when generating and transmitting information for a passenger.

In the example illustrated in the present figure, the information transmission apparatus 10 further includes an information for a vehicle transmission unit 170. Before the vehicle 50 arrives at the stop, the information for a vehicle transmission unit 170 reads, from the passenger information storage unit 120, a getting-off stop for a passenger who designates the stop as a boarding stop, and transmits information including the getting-off stop information to the vehicle 50 as information for a vehicle.

Note that, details of processing performed by each functional unit of the information transmission apparatus 10 are described later.

FIG. 3 is a diagram illustrating one example of information stored by the passenger information storage unit 120. In the example illustrated in the present figure, the passenger information storage unit 120 stores, for each passenger ID or terminal ID (hereinafter, referred to as a passenger ID), a current position of a passenger or the terminal 20 being related to the passenger ID (hereinafter, referred to as a current position of a passenger), a date and time when a boarding stop and a getting-off stop are registered, boarding stop information, getting-off stop information, a Route ID of a route passing through the boarding stop and the getting-off stop, information indicating whether boarding is completed, and information indicating whether getting off is completed. Herein, the passenger ID is an ID allocated to the passenger. The passenger ID is allocated, for example, when a passenger performs user registration in the information transmission apparatus 10. Herein, the ID is, for example, an ID allocated to software installed in the terminal 20 in order to communicate with the information transmission apparatus 10. However, when software used in the terminal 20 is a web browser, the ID may be an ID being input when logging into a web service.

FIG. 4 is a diagram illustrating one example of information stored by the vehicle information storage unit 130. In the example illustrated in the present figure, the vehicle information storage unit 130 stores, for each piece of information identifying the vehicle 50, for example, ID allocated to the communication apparatus 30 (hereinafter, referred to as communication apparatus ID), a current position of the vehicle 50 and vehicle information. The vehicle information stored in the vehicle information storage unit 130 includes at least a vehicle number (automobile registration number) and an appearance image. The appearance image is at least one (preferably both) of a front image and a side image, and preferably includes characters indicating a destination (a stop at an end point). Note that, while the vehicle information storage unit 130 is updated according to need, the update is performed, for example, by a manager of the information transmission apparatus 10. A timing at which the update is performed is, for example, a timing at which an appearance of the vehicle 50 changes, such as the vehicle 50 being wrapped.

FIGS. 5A to 5D are diagrams illustrating one example of information stored by the route information storage unit 140. As illustrated in the figures, the route information storage unit 140 stores stop information FIG. 5A), Route information (FIG. 5B), Route stop information (FIG. 5C), and service information (FIG. 5D).

As illustrated in FIG. 5A, the stop information is information in which, for each stop, an ID of the stop, a name of the stop, and position information of the stop (e.g., latitude/longitude information) are associated with each other.

As illustrated in FIG. 5B, the Route information is information in which, for each Route, a Route ID and a Route name are associated with each other.

As illustrated in FIG. 5C, the Route stop information is information in which, for each Route ID, a stop ID of a stop included in the Route, and the position in the order of stopping (stop number) of the stop in the Route are associated. Note that, in a Route passing through N bus stops, a stop number of a stop at a start point is 1, and a stop number of a stop at an end point is N.

As illustrated in FIG. 5D, the service information is information in which, for each Route ID, a departure time of a service of the Route, and a communication apparatus ID (i.e., information identifying a vehicle) are associated with each other.

Figure 6:
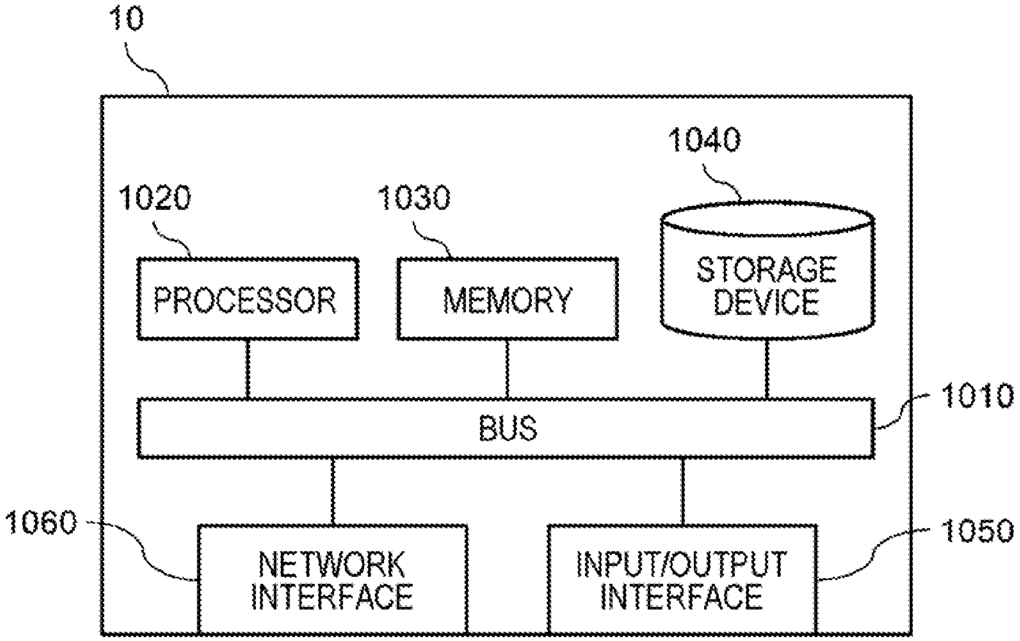
FIG. 6 is a diagram illustrating a hardware configuration example of the information transmission apparatus.

FIG. 6 is a diagram illustrating a hardware configuration example of the information transmission apparatus 10. The information transmission apparatus includes a bus 1010, a processor 1020, a memory 1030, a storage device 1040, an input/output interface 1050, and a network interface 1060.

The bus 1010 is a data transmission path through which the processor 1020, the memory 1030, the storage device 1040, the input/output interface 1050, and the network interface 1060 transmit/receive data to/from one another. However, a method of mutually connecting the processor 1020 and the like is not limited to bus connection.

The processor 1020 is a processor achieved by a central processing unit (CPU), a graphics processing unit (GPU), or the like.

The memory 1030 is a main storage apparatus achieved by a random access memory (RAM) or the like.

The storage device 1040 is an auxiliary storage apparatus achieved by a hard disk drive (HDD), a solid state drive (SSD), a memory card, a read only memory (ROM), or the like. The storage device 1040 stores a program module that achieves each function (e.g., the information acquisition unit 110, the route determination unit 150, the information for a passenger transmission unit 160, and the information for a vehicle transmission unit 170) of the information transmission apparatus 10. The processor 1020 reads each of the program modules onto the memory 1030, executes the read program module, and thereby achieves each function being related to the program module. Moreover, the storage device 1040 also functions as the passenger information storage unit 120, the vehicle information storage unit 130, and the route information storage unit 140.

The input/output interface 1050 is an interface for connecting the information transmission apparatus 10 to various kinds of pieces of input/output equipment. For example, the information transmission apparatus 10 communicates with an input device via the input/output interface 1050.

The network interface 1060 is an interface for connecting the information transmission apparatus 10 to a network. The network is, for example, a local area network (LAN) or a wide area network (WAN). A method of connecting the network interface 1060 to a network may be wireless connection, or may be wired connection. The information transmission apparatus 10 communicates with the terminal 20 and the communication apparatus 30 via the network interface 1060.

Figure 7:
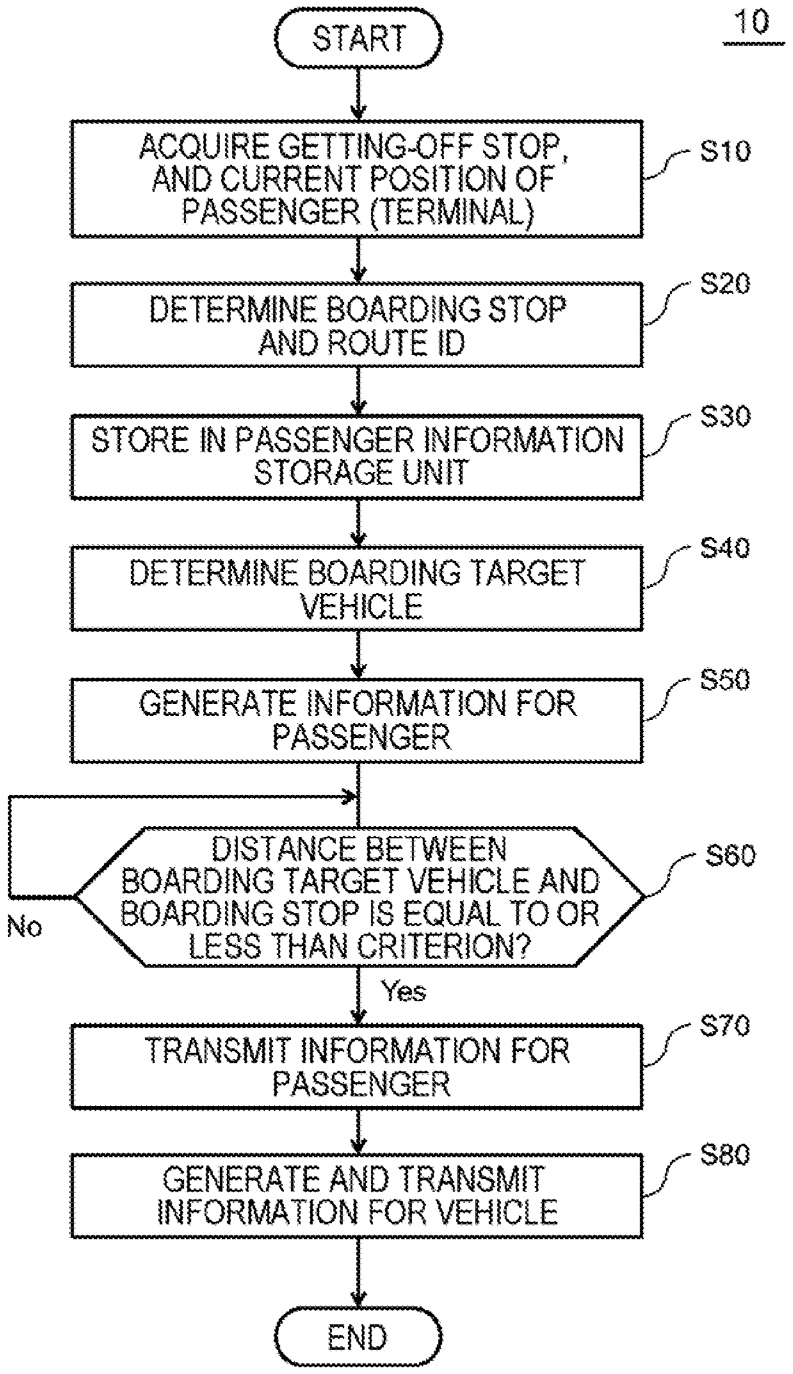
FIG. 7 is a flowchart illustrating one example of processing performed by the information transmission apparatus.

FIG. 7 is a flowchart illustrating one example of processing performed by the information transmission apparatus 10. In the processing illustrated in the present figure, a passenger ID of a passenger who utilizes the terminal 20 is previously stored in the terminal 20.

Although not illustrated in the present figure, the in-vehicle apparatus 40 of the vehicle 50 recognizes a current position of the vehicle 50. Then, the communication apparatus 30 of the vehicle 50 transmits the current position to the information transmission apparatus 10 together with a communication apparatus ID of the communication apparatus 30. Then, the information acquisition unit 110 of the information transmission apparatus 10 updates, to the acquired current position, a current position being related to the acquired communication ID in the vehicle information storage unit 130. Pieces of the processing are performed periodically. An interval of the processing is, for example, equal to or more than 1 second and equal to or less than 10 seconds.

On the other hand, a passenger being present at or near a boarding stop inputs, to the terminal 20, information specifying a getting-off stop. Herein, the information specifying the getting-off stop may be information (e.g., a name or an ID of the getting-off stop) directly indicating the getting-off stop, or may be a name or position information of a destination. Then, the terminal 20 generates position information of the terminal 20 at the time by using, for example, a GPS, and transmits, to the information transmission apparatus 10, the position information, the information specifying the getting-off stop, and the passenger ID of the terminal 20. A timing at which processing of the transmission is performed is, for example, when a passenger selects a button displayed on the terminal 20. Then, the information acquisition unit 110 of the information transmission apparatus 10 acquires the information transmitted from the terminal 20 (step S10).

The information acquisition unit 110 of the information transmission apparatus 10 determines a stop being closest to the current position acquired in step S10, by using position information of each stop stored as a part of the stop information in the route information storage unit 140, and designates the stop as a boarding stop. Then, the route determination unit 150 determines the Route ID of the route passing through the boarding stop and the getting-off stop by using the information stored in the route information storage unit 140 as the Route stop information (step S20).

Moreover, when the information specifying the getting-off stop acquired in step S10 is position information of a destination, the information acquisition unit 110 determines a stop being closest to the position information of the destination, and designates the stop as a getting-off stop. When the information specifying the getting-off stop acquired in step S10 is a name of the destination, the information acquisition unit 110 identifies the position information of the destination by using the name, determines a stop being closest to the position information, and designates the stop as a getting-off stop.

Next, the information acquisition unit 110 updates an item being related to the passenger ID acquired in step S10 in the passenger information storage unit 120. Specifically, the information acquisition unit 110 stores, in the passenger information storage unit 120, the current position, the boarding stop information, the getting-off stop information, and the Route ID acquired or determined in steps S10 and S20 (step S30). Storage processing performed herein may be overwriting or may be addition. Then, at this stage, a column indicating whether boarding is completed in the passenger information storage unit 120 indicates that boarding is not completed, and a column indicating whether getting off is completed also indicates that getting off is not done.

Note that, in step S10, a passenger may input a name or an ID of a boarding stop to the terminal 20. In this case, the information acquisition unit 110 acquires the name or the ID of the boarding stop from the terminal 20, and stores the acquired name or the acquired ID of the boarding stop in the passenger information storage unit 120.

Then, the information for a passenger transmission unit 160 of the information transmission apparatus 10 reads a Route ID, boarding stop information, and getting-off stop information of the passenger who is an object of processing from the passenger information storage unit 120. Then, the information for a passenger transmission unit 160 reads, from the route information storage unit 140, communication apparatus IDs of the vehicles 50 being related to the Route ID in service information illustrated in FIG. 5D. Then, the information for a passenger transmission unit 160 reads, from the vehicle information storage unit 130, a current position being related to the communication apparatus ID read from the service information of the route information storage unit 140, and determines a communication apparatus ID (i.e., the vehicle 50) of which the current position has not passed the boarding stop and is closest to the boarding stop. The vehicle 50 becomes a boarding target vehicle (step S40).

Then, the information for a passenger transmission unit 160 reads vehicle information of the boarding target vehicle from the vehicle information storage unit 130, and generates information for a passenger by using the vehicle information and information stored as Route information in the route information storage unit 140 (step S50). When the vehicle 50 is a fixed-route bus, the information for a passenger includes at least one of at least either a Route ID or a Route name of the boarding target vehicle, an automobile registration number, and an image of the vehicle. Moreover, the information for a passenger may also include the number of stops from a boarding stop to a getting-off stop. Moreover, the information for a passenger may include at least one of a current position of a boarding target vehicle and a face photograph of a driver.

The information for a passenger transmission unit 160 repeatedly determines whether a distance from the current position of the boarding target vehicle to the boarding stop, or a required time from the current position to the boarding stop is equal to or less than a criterion, i.e., whether the boarding target vehicle has approached the boarding stop (step S60). When the distance or the required time becomes equal to or less than the criterion (step S60: Yes), the information for a passenger transmission unit 160 transmits the information for a passenger generated in step S50 to the terminal 20 of the passenger. In this instance, the terminal 20 of a transmission destination is determined by using a passenger ID stored in the passenger information storage unit 120 (step S70). Note that, a passenger as an object of processing in steps S60 and S70 is a passenger who is in a state of not yet having boarded the vehicle 50 in the passenger information storage unit 120. Moreover, the distance or predetermined time used in step S60 is, for example, shorter than a distance or a required time from a previous stop to a boarding stop, and is equal to or less than 1 km or 1 minute.

Moreover, the processing illustrated in step S50 may be performed between steps S60 and S70.

The terminal 20 displays the transmitted information for a passenger. As described above, at least one of the Route ID of the boarding target vehicle, an automobile registration number, and an image of the vehicle is included. Then, a timing at which the display is performed is a timing at which the boarding target vehicle approaches a boarding stop. Thus, a passenger can recognize, easily and in a short time, a boarding target vehicle which he/she should ride.

Note that, when position information of a passenger is periodically acquired from the terminal 20, the information acquisition unit 110 can estimate, from transition of the position information of the passenger, that the passenger has a possibility of having boarded a boarding target vehicle. The estimation is, for example, when a moving velocity of the passenger exceeds a criterion value. Then, the information acquisition unit 110 transmits, to the terminal 20, a message for confirming the fact. The passenger inputs, to the terminal 20, information indicating whether the passenger has boarded the boarding target vehicle. Then, the terminal 20 transmits the input information to the information transmission apparatus 10. Thereby, the information acquisition unit 110 can determine whether the passenger has boarded the boarding target vehicle. Note that, the information acquisition unit 110 may determine, only by transition of position information of a passenger, whether the passenger has boarded a boarding target vehicle. Moreover, a case is possible where a function of determining a possibility that a passenger has boarded a boarding target vehicle by the information transmission apparatus 10 is not included. In this case, after boarding the boarding target vehicle, the passenger may transmit information indicating that fact to the information acquisition unit 110 of the information transmission apparatus 10 via the terminal 20. Then, when determining that the passenger has boarded the boarding target vehicle, the information acquisition unit 110 stores information indicating the fact in the passenger information storage unit 120.

On the other hand, the information for a vehicle transmission unit 170 of the information transmission apparatus 10 determines, before the vehicle 50 (including the boarding target vehicle) arrives at a stop, all passengers who designate the stop as a boarding stop, and reads getting-off stop information for the passengers from the passenger information storage unit 120. Then, information for a vehicle is generated in such a way as to include the getting-off stop information, and the information for a vehicle is transmitted to the communication apparatus 30 of the vehicle 50 (step S80). Herein, the getting-off stop information included in the information for a vehicle also includes getting-off stop information for a passenger who does not board the vehicle 50.

Note that, a timing at which information for a vehicle is generated is, for example, after departing from a previous stop and before arriving at a stop to be a target. Moreover, a timing at which information for a vehicle is transmitted to the communication apparatus 30 is, for example, when a distance or a required time from a current position of the vehicle 50 to a stop has become equal to or less than a criterion. The criterion used herein may be the same as a criterion used in boarding information (i.e., the criterion used in step S60), may be longer, or may be shorter.

The in-vehicle apparatus 40 of the vehicle 50 displays, on a display for a driver of the vehicle 50, the getting-off stop information included in the information for a vehicle acquired by the communication apparatus 30. The driver looks at the display and decides an announcement to a passenger who boards at the stop. One example of the announcement includes a content of notifying a passenger of a getting-off stop where the vehicle 50 stops, and also includes a content of notifying the passenger of a getting-off stop where the vehicle 50 does not stop (e.g., does not pass). Thereby, a possibility that a passenger boards the wrong vehicle 50 at a stop is reduced.

Figure 8:
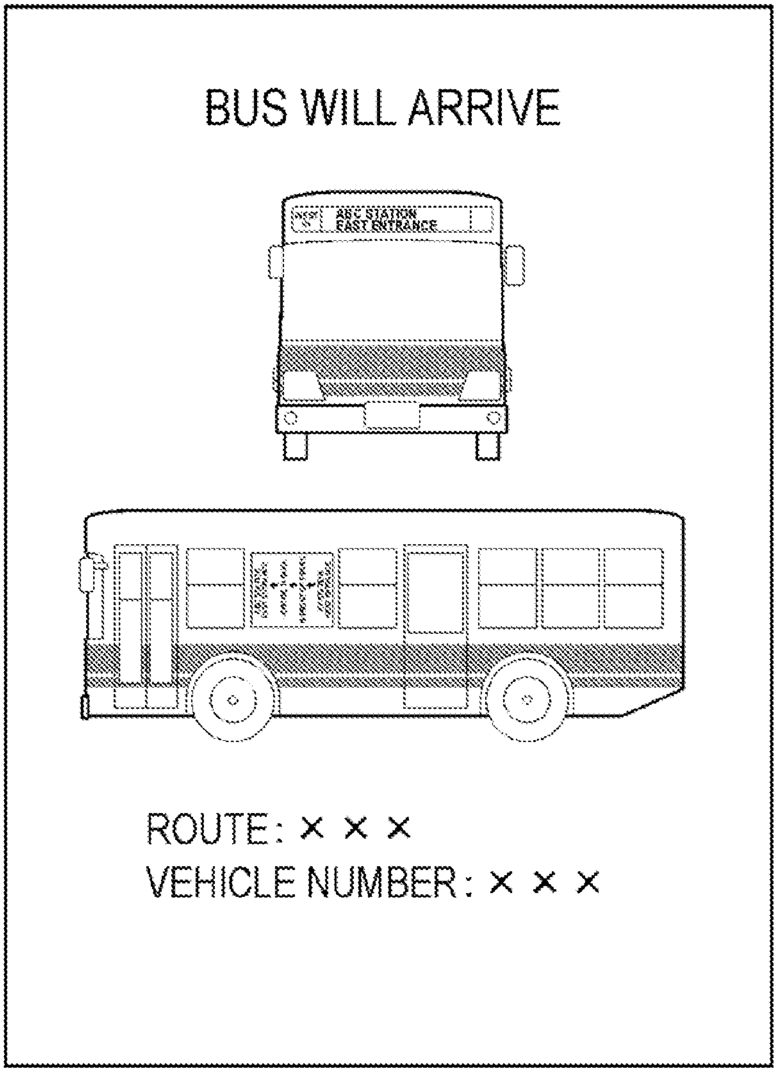
FIG. 8 is a diagram illustrating a first example of a screen displayed on a terminal after step S70.

FIG. 8 is a diagram illustrating a first example of a screen displayed on the terminal 20 after step S70. In the example illustrated in the present figure, the terminal 20 displays an image, a Route ID, and an automobile registration number (vehicle number) of an arriving boarding target vehicle, together with a statement notifying that a boarding target vehicle arrives at a boarding stop. Note that, in the example illustrated in the present figure, the image of the boarding target vehicle includes both a front image and a side image.

Figure 9:
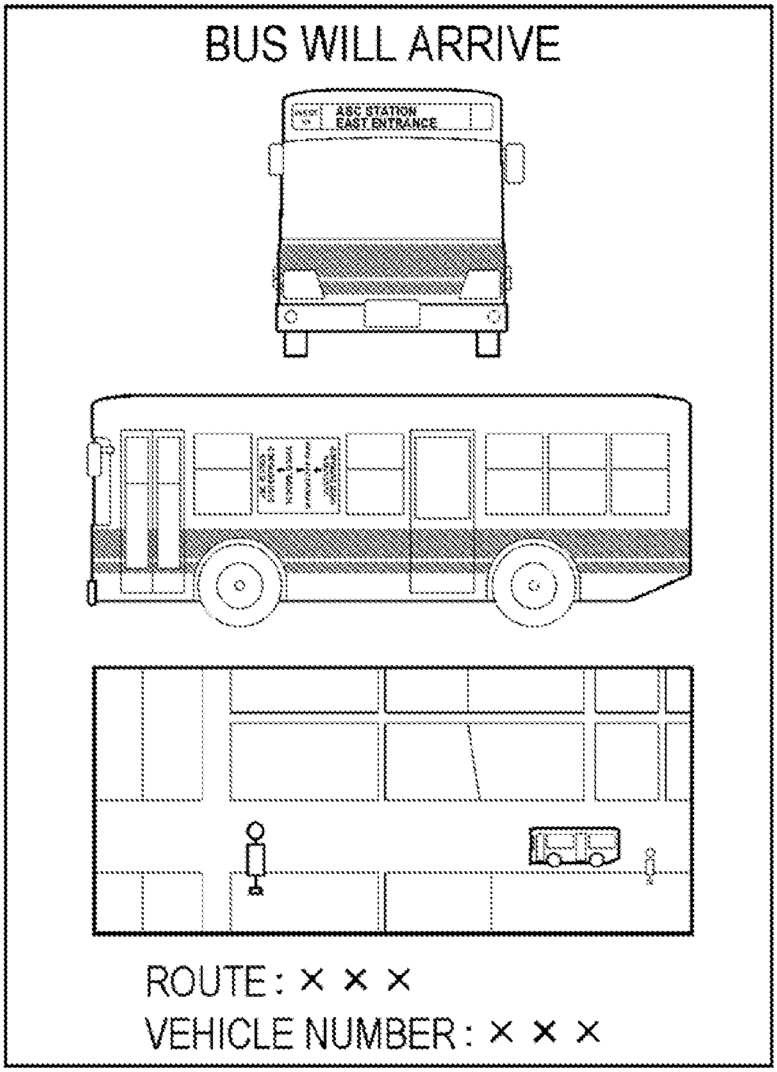
FIG. 9 is a diagram illustrating a second example of a screen displayed on the terminal after step S70.

FIG. 9 is a diagram illustrating a second example of a screen displayed on the terminal 20 after step S70. In the example illustrated in the present figure, information for a passenger transmitted from the information for a passenger transmission unit 160 of the information transmission apparatus 10 includes a current position of the boarding target vehicle and a surrounding map thereof, in addition to the example illustrated in FIG. 8. The information for a passenger transmission unit 160 of the information transmission apparatus 10 reads the surrounding map from a map database, and transmits the read surrounding map to the terminal 20.

Then, in addition to the example illustrated in FIG. 8, the terminal 20 displays a current position of the boarding target vehicle on the surrounding map. The current position may be updated by repeating communication between the information for a passenger transmission unit 160 and the terminal 20.

Figure 10:
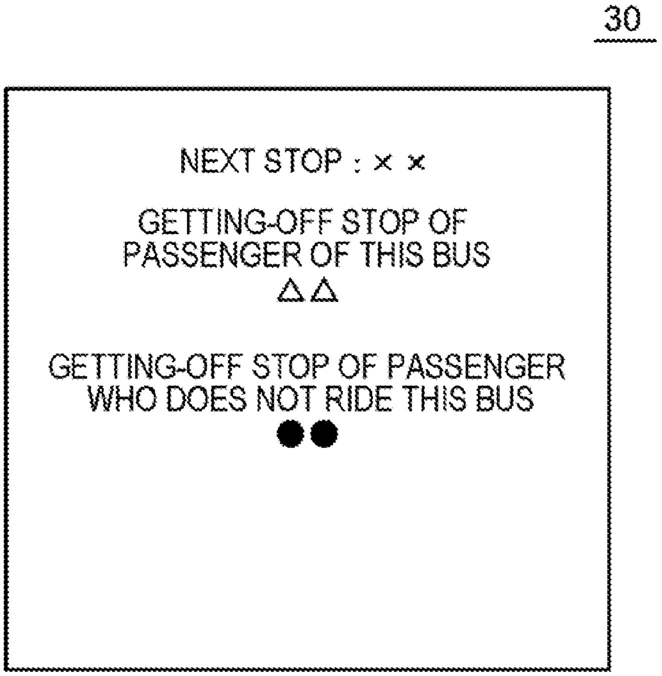
FIG. 10 is a diagram illustrating one example of a screen displayed on a display for a driver of a vehicle, after step S80.

FIG. 10 is a diagram illustrating one example of a screen displayed on a display for a driver of the vehicle 50, after step S80. In the example illustrated in the present figure, the in-vehicle apparatus 40 of the vehicle 50 displays getting-off stop information for a passenger who should board the vehicle 50 on the display, and also displays getting-off stop information for a passenger who should not board the vehicle 50. The two types of getting-off stop information are distinguishable from each other. Thus, a driver of the vehicle 50 can recognize both the getting-off stop for the passenger who should board the vehicle 50 and the getting-off stop for the passenger who should not board the vehicle 50. Note that, in this display, the getting-off stop information for the passenger who should board the vehicle 50 may not be displayed.

Figure 11:
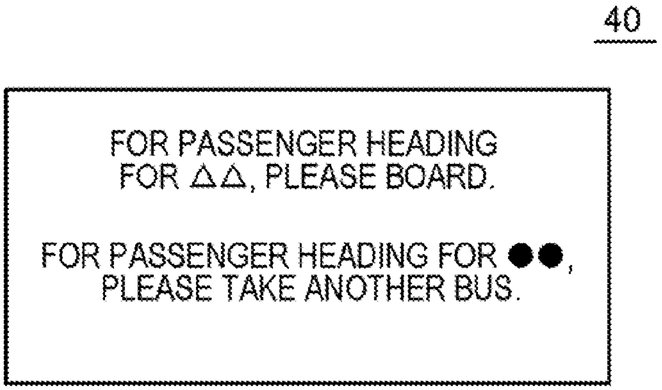
FIG. 11 is a diagram for describing a modified example of the processing performed in step S80 in FIG. 7.

FIG. 11 is a diagram for describing a modified example of processing performed in step S80 in FIG. 7. In the modified example, the information for a vehicle transmission unit 170 of the information transmission apparatus 10 may generate provision information that should be provided to a passenger or a crew member inside the vehicle 50 (including a boarding target vehicle), by using the getting-off stop information read from the passenger information storage unit 120. The provision information is, for example, text data. Then, the information for a vehicle transmission unit 170 includes the provision information in the information for a vehicle transmitted to the vehicle 50, together with getting-off stop information read from the passenger information storage unit 120 or instead of the getting-off stop information. Then, the text data are displayed on, for example, the display of the vehicle 50. Moreover, the text data may be output by audio from a speaker (including both for inside of the vehicle and for outside of the vehicle) of the vehicle 50.

Herein, a sentence included in the text data changes depending on a getting-off stop for a passenger who should not board the vehicle 50. Specifically, as illustrated in FIG. 11, the sentence includes getting-off stop information (preferably a name of the stop) for a passenger who should not board the vehicle 50, and indicates that a passenger heading for the getting-off stop should not board the vehicle 50.

Figure 12:
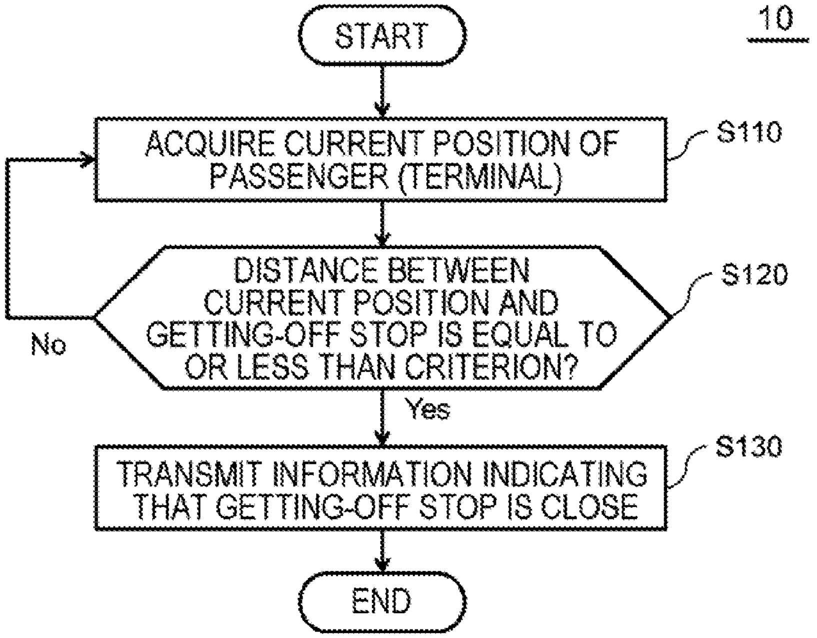
FIG. 12 is a flowchart illustrating another example of another piece of processing performed by an information for a passenger transmission unit.

FIG. 12 is a flowchart illustrating another example of another piece of processing performed by the information for a passenger transmission unit 160 of the information transmission apparatus 10. The processing illustrated in the present figure is performed after a passenger has boarded a boarding target vehicle.

First, the information acquisition unit 110 acquires a current position of a passenger from the terminal 20, and updates a current position of the passenger stored in the passenger information storage unit 120 (step S110). Then, when a distance (or an expected required time) between the current position of the passenger and a getting-off stop for the passenger becomes equal to or less than a criterion (step S120: Yes), the information for a passenger transmission unit 160 transmits information indicating the fact to the terminal 20 (step S130).

Figure 13:
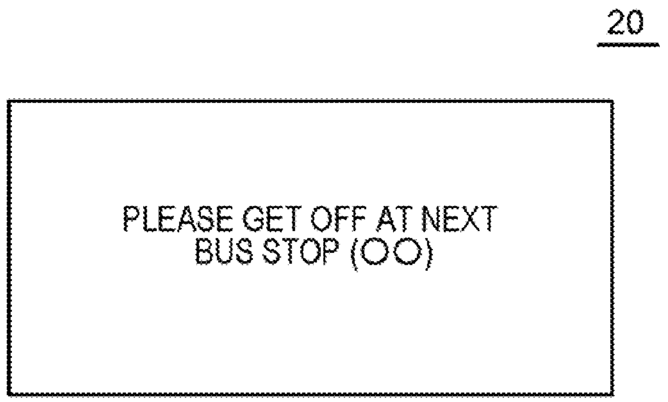
FIG. 13 is a diagram illustrating one example of display performed by a terminal.

Then, the terminal 20 performs display indicating that a getting-off stop is approaching. One example of the display is illustrated in FIG. 13. In FIG. 13, the terminal 20 displays that a next stop is a getting-off stop, together with a name of the stop. A passenger can recognize, by looking at the display, that the getting-off stop is approaching.

Then, the information acquisition unit 110 can determine, by transition of position information of a passenger, whether the passenger has got off a boarding target vehicle. Then, when determining that the passenger has got off the boarding target vehicle, the information acquisition unit 110 stores information indicating the fact in the passenger information storage unit 120.

As above, according to the present example embodiment, when the vehicle 50 (boarding target vehicle) which a passenger should board approaches a boarding stop, the information for a passenger transmission unit 160 of the information transmission apparatus 10 transmits vehicle information (boarding vehicle information) relating to the vehicle 50 to the terminal 20 of the passenger. Thus, the passenger can easily recognize, by comparing the vehicle information with the vehicle 50 that has approached (or stopped at) a boarding stop, whether the vehicle 50 is the vehicle 50 which he/she should ride.

While the example embodiment according to the present invention has been described above with reference to the drawings, the example embodiment is exemplifications of the present invention, and various configurations other than the above can be adopted.

For example, the information acquisition unit 110 may acquire, from the terminal 20 for each passenger, information (e.g., an identifier that identifies a language or nationality) that specifies a language (e.g., a native language) understandable by the passenger, and store the acquired information in the passenger information storage unit 120. The information is, for example, information that specifies a language set in the terminal 20. In this case, the information for a vehicle transmission unit 170 may include, in information for a vehicle transmitted to the vehicle 50, language information of a passenger who boards at a stop at which the vehicle stops next. In this way, a crew member, for example, a driver, can provide guidance according to a language of a passenger. Moreover, the information for a vehicle transmission unit 170 may generate text data to be included in information for a vehicle, in a language used by a passenger. In this case, in the vehicle 50, display can be performed on a display or a sound can be output in the language used by the passenger.

Moreover, the vehicle 50 may be a railroad vehicle. In this case, a stop becomes a railroad station. For example, when a plurality of routes enter one station, or when there is a distinction between a local train, an express train, and a limited express train, it is difficult for a passenger to determine whether a vehicle (e.g., a train) arriving at the station is a vehicle that he/she intends. Even in such a case, the information transmission apparatus 10 acquires boarding station information (equivalent to boarding stop information) and getting-off station information (equivalent to getting-off stop information) of the passenger, performs the processing described above, and can thereby provide appropriate information to the passenger and a crew member of the railroad. As a result, the passenger is allowed to easily determine a train which he/she should ride. Moreover, the crew member can perform appropriate guidance to the passenger.

Moreover, although a plurality of processes (pieces of processing) are described in order in a plurality of flowcharts used in the above description, an execution order of processes executed in each example embodiment is not limited to the described order. In each example embodiment, an order of illustrated processes can be changed to an extent that causes no problem in terms of content. Moreover, each example embodiment described above can be combined to an extent that content does not contradict.

Some or all of the above-described example embodiments can also be described as, but are not limited to, the following supplementary notes.

1. An information transmission apparatus including:
   an information acquisition unit that acquires boarding stop information indicating a boarding stop where a passenger boards a vehicle, and getting-off stop information indicating a getting-off stop where the passenger gets off the vehicle;
   a route determination unit that determines, by using a route information storage unit storing a plurality of stops included in a route for each of a plurality of the routes, the boarding stop information, and the getting-off stop information, route information indicating a route of a vehicle that the passenger should board; and
   an information for a passenger transmission unit that determines, by using a current position of a boarding target vehicle traveling on the route indicated by the route information, and the boarding stop information, a timing of transmitting information for a passenger including information on the boarding target vehicle, and transmits, at the determined timing, the information for a passenger to a terminal carried by the passenger.
2. The information transmission apparatus according to supplementary note 1, in which
   the information for a passenger transmission unit transmits the information for a passenger to the terminal when a distance or an expected required time from a current position of the boarding target vehicle to a position of the boarding stop becomes equal to or less than a criterion.
3. The information transmission apparatus according to supplementary note 1 or 2, in which
   the vehicle is a fixed-route bus, and
   the information for a passenger includes at least one of a Route ID of the boarding target vehicle, an automobile registration number, and an image of the vehicle.
4. The information transmission apparatus according to any one of supplementary notes 1 to 3, in which
   the information for a passenger includes a current position of the boarding target vehicle.
5. The information transmission apparatus according to any one of supplementary notes 1 to 4, further including:
   a passenger information storage unit that stores the getting-off stop information in association with the boarding stop information for each of a plurality of the passengers; and
   an information for a vehicle transmission unit that, before the vehicle arrives at the stop, reads, from the passenger information storage unit, the getting-off stop information for the passenger who designates the stop as the boarding stop, and transmits information for a vehicle including the getting-off stop information to the vehicle.
6. The information transmission apparatus according to supplementary note 5, in which
   the information for a vehicle transmission unit includes, in the information for a vehicle, the getting-off stop information for the passenger who does not board the boarding target vehicle.
7. The information transmission apparatus according to supplementary note 5 or 6, further including
   a provision information generation unit that generates provision information that should be provided to a passenger or a crew member inside the boarding target vehicle, by using the getting-off stop information read from the passenger information storage unit, in which
   the information for a vehicle transmission unit includes the provision information in the information for a vehicle, together with the getting-off stop information read from the passenger information storage unit or instead of the getting-off stop information read from the passenger information storage unit.
8. The information transmission apparatus according to any one of supplementary notes 1 to 7, in which
   the information acquisition unit repeatedly acquires, after the passenger boards the boarding target vehicle, passenger position information indicating a position of the passenger, the terminal, or the boarding target vehicle, and
   the information for a passenger transmission unit transmits, when a difference between the position indicated by the passenger position information and a position of the getting-off stop satisfies a criterion, information indicating the fact to the terminal.
9. An information transmission method performed by a computer, the method including:
   information acquisition processing of acquiring boarding stop information indicating a boarding stop where a passenger boards a vehicle, and getting-off stop information indicating a getting-off stop where the passenger gets off the vehicle;
   route determination processing of determining, by using a route information storage unit storing a plurality of stops included in a route for each of a plurality of the routes, the boarding stop information, and the getting-off stop information, route information indicating a route of a vehicle that the passenger should board; and
   information for a passenger transmission processing of determining, by using a current position of a boarding target vehicle traveling on the route indicated by the route information, and the boarding stop information, a timing of transmitting information for a passenger including information on the boarding target vehicle, and transmitting, at the determined timing, the information for a passenger to a terminal carried by the passenger.

10. The information transmission method performed by the computer according to supplementary note 9, in which in the information for a passenger transmission processing, the information for a passenger is transmitted to the terminal when a distance or an expected required time from a current position of the boarding target vehicle to a position of the boarding stop becomes equal to or less than a criterion.

11. The information transmission method according to supplementary note 9 or 10, in which the vehicle is a fixed-route bus, and the information for a passenger includes at least one of a Route ID of the boarding target vehicle, an automobile registration number, and an image of the vehicle.

12. The information transmission method according to any one of supplementary notes 9 to 11, in which the information for a passenger includes a current position of the boarding target vehicle.

13. The information transmission method performed by the computer according to any one of supplementary notes 9 to 12, in which the computer is connectable to a passenger information storage unit that stores the getting-off stop information in association with the boarding stop information for each of a plurality of the passengers, the method further including information for a vehicle transmission processing of, before the vehicle arrives at the stop, reading, from the passenger information storage unit, the getting-off stop information for the passenger who designates the stop as the boarding stop, and transmitting information for a vehicle including the getting-off stop information to the vehicle.

14. The information transmission method performed by the computer according to supplementary note 13, in which in the information for a vehicle transmission processing, the getting-off stop information for the passenger who does not board the boarding target vehicle is included in the information for a vehicle.

15. The information transmission method performed by the computer according to supplementary note 13 or 14, the method further including:

provision information generation processing of generating provision information that should be provided to a passenger or a crew member inside the boarding target vehicle, by using the getting-off stop information read from the passenger information storage unit, in which in the information for a vehicle transmission processing, the provision information is included in the information for a vehicle, together with the getting-off stop information read from the passenger information storage unit or instead of the getting-off stop information read from the passenger information storage unit.

16. The information transmission method performed by the computer according to any one of supplementary notes 9 to 15, in which in the information acquisition processing, after the passenger boards the boarding target vehicle, passenger position information indicating a position of the passenger, the terminal, or the boarding target vehicle is repeatedly acquired; and, in the information for a passenger transmission processing, when a difference between the position indicated by the passenger position information and a position of the getting-off stop satisfies a criterion, information indicating the fact is transmitted to the terminal.

17. A program causing a computer to include:

an information acquisition function of acquiring boarding stop information indicating a boarding stop where a passenger boards a vehicle, and getting-off stop information indicating a getting-off stop where the passenger gets off the vehicle;

a route determination function of determining, by using a route information storage unit storing a plurality of stops included in a route for each of a plurality of the routes, the boarding stop information, and the getting-off stop information, route information indicating a route of a vehicle that the passenger should board; and an information for a passenger transmission function of determining, by using a current position of a boarding target vehicle traveling on the route indicated by the route information, and the boarding stop information, a timing of transmitting information for a passenger including information on the boarding target vehicle, and transmitting, at the determined timing, the information for a passenger to a terminal carried by the passenger.

18. The program according to supplementary note 17, in which the information for a passenger transmission function transmits the information for a passenger to the terminal when a distance or an expected required time from a current position of the boarding target vehicle to a position of the boarding stop becomes equal to or less than a criterion.

19. The program according to supplementary note 17 or 18, in which the vehicle is a fixed-route bus, and the information for a passenger includes at least one of a Route ID of the boarding target vehicle, an automobile registration number, and an image of the vehicle.

20. The program according to any one of supplementary notes 17 to 19, in which the information for a passenger includes a current position of the boarding target vehicle.

21. The program according to any one of supplementary notes 17 to 20, in which the computer is connectable to a passenger information storage unit that stores the getting-off stop information in association with the boarding stop information for each of a plurality of the passengers, the program further causes the computer to include an information for a vehicle transmission function of, before the vehicle arrives at the stop, reading, from the passenger information storage unit, the getting-off stop information for the passenger who designates the stop as the boarding stop, and transmitting information for a vehicle including the getting-off stop information to the vehicle.

22. The program according to supplementary note 21, in which the information for a vehicle transmission function includes, in the information for a vehicle, the getting-off stop information for the passenger who does not board the boarding target vehicle.

23. The program according to supplementary note 21 or 22, further causing the computer to include a provision information generation function of generating provision information that should be provided to a passenger or a crew member inside the boarding target vehicle, by using the getting-off stop information read from the passenger information storage unit, in which the information for a vehicle transmission function includes the provision information in the information for a vehicle, together with the getting-off stop information read from the passenger information storage unit or instead of the getting-off stop information read from the passenger information storage unit.

24. The program according to any one of supplementary notes 17 to 23, in which the information acquisition function repeatedly acquires, after the passenger boards the boarding target vehicle, passenger position information indicating a position of the passenger, the terminal, or the boarding target vehicle, and the information for a passenger transmission function transmits, when a difference between the position indicated by the passenger position information and a position of the getting-off stop satisfies a criterion, information indicating the fact to the terminal.

REFERENCE SIGNS LIST

10 Information transmission apparatus
20 Terminal
30 Communication apparatus
40 In-vehicle apparatus
110 Information acquisition unit
120 Passenger information storage unit
130 Vehicle information storage unit
140 Route information storage unit
150 Route determination unit
160 Information for a passenger transmission unit
170 Information for a vehicle transmission unit

What is claimed is:

1. An information transmission apparatus comprising:

at least one memory configured to store instructions; and at least one processor configured to execute the instructions to perform operations, the operation comprising:

acquiring boarding stop information and getting-off stop information, the boarding stop information indicating a boarding stop where a passenger boards a vehicle and the getting-off stop information indicating a getting-off stop where the passenger gets off the vehicle;

determining route information based on the boarding stop information, the getting-off stop information and information on a plurality of stops included in a route for each of a plurality of the routes stored in a route information storage, the route information indicating a route of a vehicle that the passenger should board; and determining a timing of transmitting information for a passenger based on the boarding stop information and a current position of a boarding target vehicle traveling on the route indicated by the route information, the information for a passenger including information on the boarding target vehicle; and transmitting, at the determined timing, the information for a passenger to a terminal carried by the passenger.

2. The information transmission apparatus according to claim 1, wherein the operations comprise transmitting the information for a passenger to the terminal in a case that a distance or an expected required time from a current position of the boarding target vehicle to a position of the boarding stop becomes equal to or less than a criterion.

3. The information transmission apparatus according to claim 1, wherein the vehicle is a fixed-route bus, and the information for a passenger includes at least one of a Route ID of the boarding target vehicle, an automobile registration number, and an image of the vehicle.

4. The information transmission apparatus according to claim 1, wherein the information for a passenger includes a current position of the boarding target vehicle.

5. The information transmission apparatus according to claim 1, wherein the operations further comprise:

storing the getting-off stop information in association with the boarding stop information for each of a plurality of the passengers; and before the vehicle arrives at the stop, reading, from a passenger information storage, the getting-off stop information for the passenger who designates the stop as the boarding stop, and transmitting information for a vehicle including the getting-off stop information to the vehicle.

6. The information transmission apparatus according to claim 5, wherein the operations comprise including, in the information for a vehicle, the getting-off stop information for the passenger who does not board the boarding target vehicle.

7. The information transmission apparatus according to claim 5, wherein the operations further comprise:

generating provision information based on the getting-off stop information read from the passenger information storage, the provision information provided to a passenger or a crew member inside the boarding target vehicle; and including the provision information in the information for a vehicle, together with or instead of the getting-off stop information read from the passenger information storage.

8. The information transmission apparatus according to claim 1, wherein the operations comprise repeatedly acquiring, after the passenger boards the boarding target vehicle, passenger position information indicating a position of the passenger, the terminal, or the boarding target vehicle, and in a case that a difference between the position indicated by the passenger position information and a position of the getting-off stop satisfies a criterion, transmitting, to the terminal, information indicating that the getting-off stop is approaching.

9. An information transmission method performed by a computer, the method comprising:

acquiring boarding stop information and getting-off information, the boarding stop information indicating a boarding stop where a passenger boards a vehicle and the getting-off stop information indicating a getting-off stop where the passenger gets off the vehicle;

determining route information based on the boarding stop information, the getting-off stop information and information on a plurality of stops included in a route for each of a plurality of the routes stored in a route information storage, the route information indicating a route of a vehicle that the passenger should board; and determining a timing of transmitting information for a passenger based on the boarding stop information and a current position of a boarding target vehicle traveling on the route indicated by the route information, the information for a passenger including information on the boarding target vehicle; and transmitting, at the determined timing, the information for a passenger to a terminal carried by the passenger.

10. The information transmission method performed by the computer according to claim 9, wherein the information for a passenger is transmitted to the terminal in a case that a distance or an expected required time from a current position of the boarding target vehicle to a position of the boarding stop becomes equal to or less than a criterion.

11. The information transmission method according to claim 9, wherein the vehicle is a fixed-route bus, and the information for a passenger includes at least one of a Route ID of the boarding target vehicle, an automobile registration number, and an image of the vehicle.

12. The information transmission method according to claim 9, wherein the information for a passenger includes a current position of the boarding target vehicle.

13. The information transmission method performed by the computer according to claim 9, wherein the computer is connectable to a passenger information storage that stores the getting-off stop information in association with the boarding stop information for each of a plurality of the passengers, the method further comprising:

before the vehicle arrives at the stop, reading, from the passenger information storage, the getting-off stop information for the passenger who designates the stop as the boarding stop, and transmitting information for a vehicle including the getting-off stop information to the vehicle.

14. The information transmission method performed by the computer according to claim 9, wherein after the passenger boards the boarding target vehicle, passenger position information indicating a position of the passenger, the terminal, or the boarding target vehicle is repeatedly acquired; and, in a case that a difference between the position indicated by the passenger position information and a position of the getting-off stop satisfies a criterion, information is transmitted to the terminal, the information indicating that the getting-off stop is approaching.

15. A non-transitory computer-readable medium storing a program for causing a computer to include: perform operations, the operations comprising:

acquiring boarding stop information and getting-off stop information, the boarding stop information, the boarding stop information indicating a boarding stop where a passenger boards a vehicle and the getting-off stop information indicating a getting-off stop where the passenger gets off the vehicle;

determining route information based on the boarding stop information, the getting-off stop information and information on a plurality of stops included in a route for each of a plurality of the routes stored in a route information storage, the route information indicating a route of a vehicle that the passenger should board; and determining a timing of transmitting information for a passenger based on the boarding stop information and a current position of a boarding target vehicle traveling on the route indicated by the route information, the information for a passenger including information on the boarding target vehicle; and transmitting, at the determined timing, the information for a passenger to a terminal carried by the passenger.

16. The non-transitory computer-readable medium according to claim 15, wherein the program further causes the computer to perform transmitting the information for a passenger to the terminal in a case that a distance or an expected required time from a current position of the boarding target vehicle to a position of the boarding stop becomes equal to or less than a criterion.

17. The non-transitory computer-readable medium according to claim 15, wherein the vehicle is a fixed-route bus, and the information for a passenger includes at least one of a Route ID of the boarding target vehicle, an automobile registration number, and an image of the vehicle.

18. The non-transitory computer-readable medium according to claim 15, wherein the information for a passenger includes a current position of the boarding target vehicle.

19. The non-transitory computer-readable medium according to claim 17, wherein the computer is connectable to a passenger information storage unit that stores the getting-off stop information in association with the boarding stop information for each of a plurality of the passengers, the program further causes the computer to perform before the vehicle arrives at the stop, reading, from the passenger information storage, the getting-off stop information for the passenger who designates the stop as the boarding stop, and transmitting information for a vehicle including the getting-off stop information to the vehicle.

20. The non-transitory computer-readable medium according to claim 15, wherein the program further causes the computer to perform repeatedly acquiring, after the passenger boards the boarding target vehicle, passenger position information indicating a position of the passenger, the terminal, or the boarding target vehicle, and in a case that a difference between the position indicated by the passenger position information and a position of the getting-off stop satisfies a criterion, transmitting, to the terminal, information indicating that the getting-off stop is approaching.

* * * * *